United States Patent
Ballantyne et al.

(10) Patent No.: US 12,517,713 B2
(45) Date of Patent: Jan. 6, 2026

(54) APPLICATION OF STORAGE RETENTION POLICIES TO A SOFTWARE DEPLOYMENT PIPELINE IN RESPONSE TO CODE BRANCH MERGERS

(71) Applicant: Dell Products L.P., Round Rock, TX (US)

(72) Inventors: Robert A. Ballantyne, Mansfield, MA (US); Benjamin J. Pitzer, Morrisville, NC (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/360,579

(22) Filed: Jul. 27, 2023

(65) Prior Publication Data

US 2025/0036383 A1 Jan. 30, 2025

(51) Int. Cl.
*G06F 11/36* (2025.01)
*G06F 8/60* (2018.01)
(Continued)

(52) U.S. Cl.
CPC ............... *G06F 8/60* (2013.01); *G06F 8/70* (2013.01); *G06F 8/62* (2013.01); *G06F 8/65* (2013.01);
(Continued)

(58) Field of Classification Search
CPC ... G06F 8/60; G06F 8/70; G06F 9/455; G06F 9/545; G06F 8/71; G06F 8/65; G06F 8/77;
(Continued)

(56) References Cited

U.S. PATENT DOCUMENTS 10,613,970 B1 * 4/2020 Jammula ............. G06F 11/3688
11,283,697 B1 * 3/2022 Rajagopalan ........... H04L 43/20
(Continued)

OTHER PUBLICATIONS

"Set Retention Policies for Builds, Releases, and Tests"; Azure DevOps Services/Azure DevOps Server 2022—Azure DevOps Server 2019/TFS 2018; May 3, 2023.
(Continued)

*Primary Examiner* — Anibal Riveracruz
(74) *Attorney, Agent, or Firm* — Ryan, Mason & Lewis, LLP

(57) ABSTRACT

Techniques are provided for application of storage retention policies to a software deployment pipeline in response to code branch mergers. One method comprises, in response to a request to merge a first code branch of a first stage with a second code branch of a second stage of a software deployment pipeline: initiating a transition of the software deployment pipeline from a software repository associated with the first stage to a software repository associated with the second stage; and applying a software retention policy to the software repository associated with the first stage. The merge of the first code branch with the second code branch may be performed in connection with a pull request. The transition of the software deployment pipeline from the software repository associated with the first stage to the software repository associated with the second stage may be performed in connection with a build promotion.

20 Claims, 16 Drawing Sheets

(51) Int. Cl.

| | | |
|---|---|---|
| *G06F 8/70* | (2018.01) | |
| *G06F 9/455* | (2018.01) | |
| *G06F 9/54* | (2006.01) | |
| *G06F 11/14* | (2006.01) | |
| *G06F 8/61* | (2018.01) | |
| *G06F 8/65* | (2018.01) | |
| *G06F 8/71* | (2018.01) | |
| *G06F 8/77* | (2018.01) | |
| *G06F 11/34* | (2006.01) | |
| *G06F 11/3604* | (2025.01) | |
| *G06F 11/3668* | (2025.01) | |
| *G06F 16/901* | (2019.01) | |
| *G06F 16/9038* | (2019.01) | |
| *G06F 16/9535* | (2019.01) | |
| *G06F 16/9537* | (2019.01) | |

(52) U.S. Cl.
CPC ............... *G06F 8/71* (2013.01); *G06F 8/77* (2013.01); *G06F 11/1469* (2013.01); *G06F 11/3409* (2013.01); *G06F 11/3616* (2013.01); *G06F 11/3688* (2013.01); *G06F 11/3692* (2013.01); *G06F 16/9024* (2019.01); *G06F 16/9038* (2019.01); *G06F 16/9535* (2019.01); *G06F 16/9537* (2019.01)

(58) Field of Classification Search
CPC .... G06F 8/62; G06F 11/3688; G06F 11/3692; G06F 11/1469; G06F 11/3616; G06F 11/3409; G06F 16/9024; G06F 16/9038; G06F 16/9537; G06F 16/9535
See application file for complete search history.

(56) References Cited

U.S. PATENT DOCUMENTS

| | | | | |
|---|---|---|---|---|
| 2017/0169370 | A1* | 6/2017 | Cornilescu | G06Q 10/06395 |
| 2018/0341473 | A1* | 11/2018 | Watt, Jr. | G06F 21/6218 |
| 2019/0317754 | A1* | 10/2019 | Mosquera | G06F 11/3495 |
| 2021/0141718 | A1* | 5/2021 | Sandhu | G06F 8/60 |
| 2022/0311794 | A1* | 9/2022 | Maya | G06F 11/0766 |
| 2024/0289261 | A1* | 8/2024 | Walker | G06F 11/3688 |
| 2024/0427559 | A1* | 12/2024 | Li | G06F 8/22 |

OTHER PUBLICATIONS

Schulman, Robin; "Record Retention Policy"; downloaded Jul. 20, 2023.

Folberth, John; "Dynamically Retain Azure DevOps Pipelines"; Azure Pipelines; Mar. 24, 2022.

* cited by examiner

APPLICATION OF STORAGE RETENTION POLICIES TO A SOFTWARE DEPLOYMENT PIPELINE IN RESPONSE TO CODE BRANCH MERGERS

BACKGROUND

A software deployment pipeline automates a software delivery process, and typically comprises a set of automated processes and tools that allow software developers and an operations team to work together to generate and deploy application software code to a production environment using a software development platform. Software development tasks often require management of various aspects of a software deployment pipeline.

SUMMARY

In one embodiment, a method comprises, in response to a merge event that merges a first code branch of a first stage of a software deployment pipeline with a second code branch of a second stage of the software deployment pipeline: automatically initiating a transition of the software deployment pipeline from at least one software repository associated with the first stage of the software deployment pipeline to at least one software repository associated with the second stage of the software deployment pipeline; and automatically applying one or more software retention policies to the at least one software repository associated with the first stage.

In some embodiments, the merge event is detected by monitoring one or more events published on a message queue. The merge of the first code branch of the first stage of the software deployment pipeline with the second code branch of the second stage of the software deployment pipeline may be performed in connection with a processing of a pull request. The transition of the software deployment pipeline from the at least one software repository associated with the first stage to the at least one software repository associated with the second stage may be performed in connection with a processing of a build promotion.

In one or more embodiments, the transition of the software deployment pipeline from the at least one software repository associated with the first stage to the at least one software repository associated with the second stage one or more of moves and copies one or more software items from the at least one software repository associated with the first stage to the at least one software repository associated with the second stage. The automatically applying the one or more software retention policies may comprise executing one or more retention scripts for the at least one software repository associated with the first stage.

Illustrative embodiments can provide significant advantages relative to conventional techniques. For example, technical problems associated with retaining software code associated with a software deployment pipeline are mitigated in one or more embodiments by automatically applying storage retention policies to a software deployment pipeline in response to a pipeline stage merger.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for management of a software deployment pipeline.

The term DevOps generally refers to a set of practices that combines software development and information technology (IT) operations. DevOps are increasingly being used to shorten the software development lifecycle and to provide continuous integration, continuous delivery, and continuous deployment. Continuous integration (CI) generally allows development teams to merge and verify changes more often by automating software generation (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment (CD) allows code changes that pass an automated testing phase to be automatically released into the production environment, thus making the changes visible to end users. Such processes are typically executed within a software generation and deployment pipeline.

DevOps solutions typically employ blueprints that encompass continuous integration, continuous testing (CT), continuous deployment (also referred to as continuous development) and/or continuous change and management (CCM) abilities. DevOps blueprints allow development teams to efficiently innovate by automating workflows for a software development and delivery lifecycle. A typical software development lifecycle is discussed further below in conjunction with FIG. 2.

As noted above, a software deployment pipeline (sometimes referred to as a CI/CD pipeline) automates a software delivery process, and typically comprises a set of automated processes and tools that allows developers and an operations team to work together to generate and deploy application software code to a production environment. A preconfigured software deployment pipeline may comprise a specified set of elements and/or environments. Such elements and/or environments may be added or removed from the software deployment pipeline, for example, based at least in part on the software and/or compliance requirements. A software deployment pipeline typically comprises one or more quality control gates to ensure that software code does not get released to a production environment without satisfying a number of predefined testing and/or quality requirements. For example, a quality control gate may specify that software code should compile without errors and that all unit tests and functional user interface tests must pass.

Figure 1:
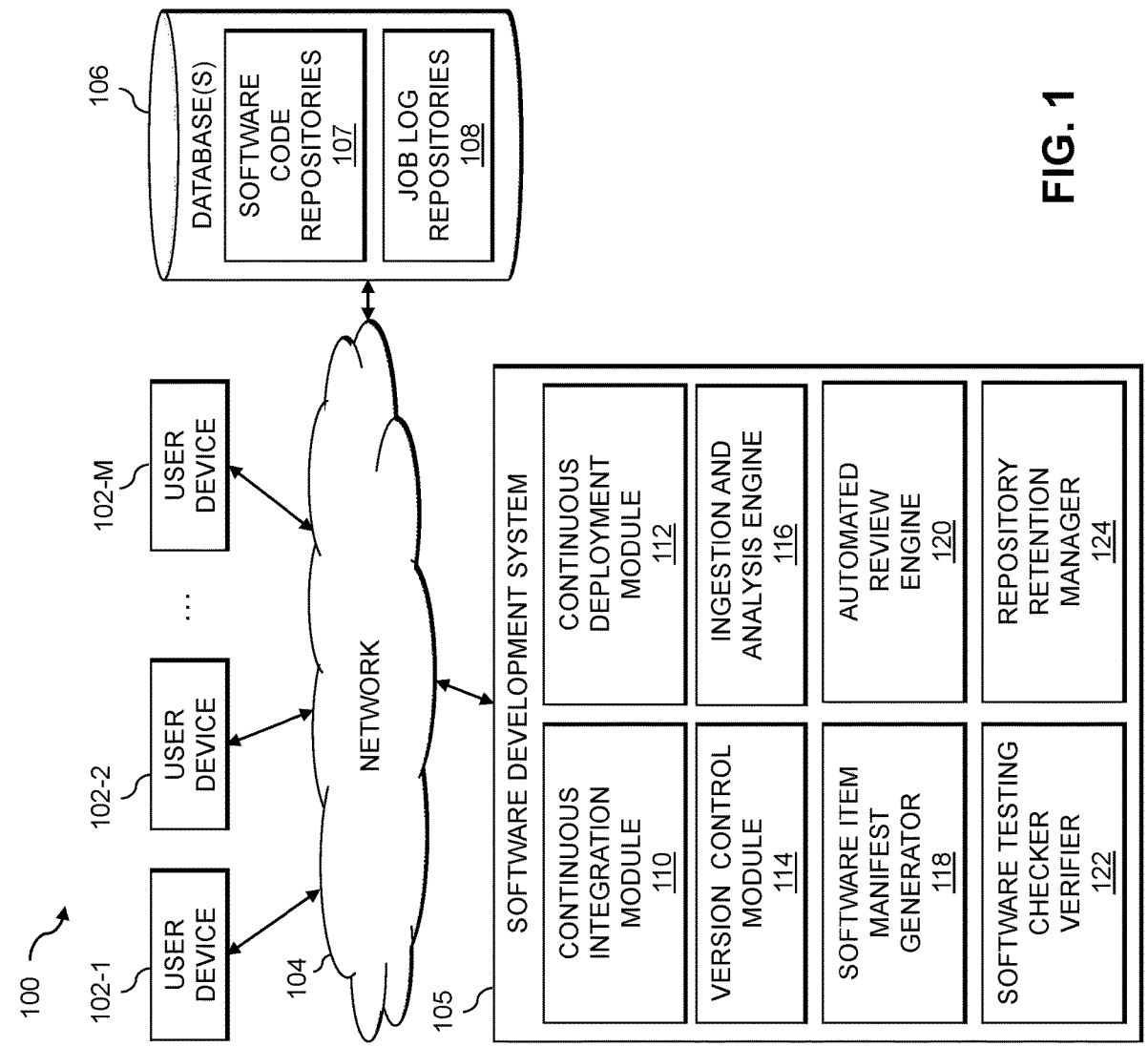
FIG. 1 illustrates an information processing system configured for management of a software deployment pipeline, in accordance with an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a continuous deployment module 112, a version control module 114, an ingestion and analysis engine 116, a software item manifest generator 118, an automated review engine 120, a software testing checker verifier 122 and a repository retention manager 124. Exemplary processes utilizing elements 110, 112, 114, 116, 118, 120, 122 and/or 124 will be described in more detail with reference to, for example, FIGS. 4, 5, 6A, 6B, 7 and 9 through 13.

In at least some embodiments, the continuous integration module 110, the continuous deployment module 112 and/or the version control module 114, or portions thereof, may be implemented using functionality provided, for example, by commercially available DevOps and/or CI/CD tools, such as Git-based DevOps and/or CI/CD tools. The continuous integration module 110, the continuous deployment module 112 and/or the version control module 114 may be configured, for example, to perform CI/CD tasks and to provide access to DevOps tools and/or repositories. The continuous integration module 110 provides functionality for automating the integration of software code changes from multiple software developers or other DevOps professionals into a single software project. The continuous deployment module 112 manages the automatic release of software code changes made by one or more software developers from a software repository to a production environment, for example, after validating the stages of production.

In one or more embodiments, the version control module 114 manages canonical schemas (e.g., blueprints, job templates, and software scripts for jobs) and other aspects of the repository composition available from the DevOps and/or CI/CD tools. Source code management (SCM) techniques may be used to track modifications to a source code repository. In some embodiments, SCM techniques are employed to track a history of changes to a software code base and to resolve conflicts when merging updates from multiple software developers.

In at least some embodiments, the ingestion and analysis engine 116 may implement at least portions of the disclosed techniques for management of a software deployment pipeline, as discussed further below in conjunction with, for example, FIG. 4. The software item manifest generator 118 may generate a manifest (e.g., a bill of materials (BOM)) of one or more software items in a given stage of a software deployment pipeline using metadata associated with the one or more software items, as discussed further below in conjunction with, for example, FIG. 5.

In some embodiments, the ingestion and analysis engine 116 is modified to generate a manifest at one or more stages of the software deployment pipeline. For example, after each transformation of the software deployment pipeline, a new manifest may be generated comprising the metadata about the software items in the particular pipeline stage. The generated manifest may be provided to a repository manager (e.g., that manages artifacts, binaries, files and/or containers associated with the software deployment pipeline) with the generated software. In this manner, an incremental manifest is provided that details the artifacts and other items used at each pipeline stage. The generated manifest may be saved at each pipeline stage so that it can be used by subsequent pipeline stages. In a final pipeline stage, the manifest will contain an accurate inventory of all of the dependency content (e.g., internal IP, Open-Source Software (OSS) and third-party software) contained within the product. The final manifest can be filtered and transformed to create a software bill of materials (SBOM) for customers.

In one or more embodiments, the automated review engine 120 automatically evaluates an approval status, for example, of one or more software items of a software deployment pipeline, as discussed further below in conjunction with, for example, FIGS. 6A and 6B. The software testing checker verifier 122 may evaluate software deployment pipeline stages by applying software testing checkers, as discussed further below in conjunction with, for example, FIG. 7. The term "software testing checker" as used herein shall be broadly construed to encompass any software function or other processor-based event-driven entity that evaluates software, such as a static software scanner and/or a dynamic software scanner. The results from one or more software testing checkers may be evaluated in connection with a policy. Exemplary events associated with the software may comprise, for example, software push events, such as a software build request, a software pull request and/or a software deployment request, or other events that transition software from one stage to another (e.g., a software development stage to a software deployment stage).

The repository retention manager 124 may apply storage retention policies to a software deployment pipeline in response to code branch mergers (e.g., a merge event that merges a first code branch of the software deployment pipeline with a second code branch), as discussed further below in conjunction with, for example, FIG. 9. The repository retention manager 124 may apply one or more retention scripts, for example, to a software repository associated with a prior stage of the software deployment pipeline.

It is to be appreciated that this particular arrangement of elements 110, 112, 114, 116, 118, 120, 122 and/or 124 illustrated in the software development system 105 of the FIG. 1 embodiment is presented by way of example only, and alternative arrangements can be used in other embodiments. For example, the functionality associated with the elements 110, 112, 114, 116, 118, 120, 122 and/or 124 in other embodiments can be combined into a single module, or separated across a larger number of modules. As another example, multiple distinct processors can be used to implement different ones of the elements 110, 112, 114, 116, 118, 120, 122 and/or 124 or portions thereof.

At least portions of elements 110, 112, 114, 116, 118, 120, 122 and/or 124 may be implemented at least in part in the form of software that is stored in memory and executed by a processor.

Additionally, the software development system 105 can have at least one associated database 106 configured to store data comprising, for example, one or more repositories 107 of software code of at least one application and/or one or more repositories 108 of job logs. For example, at least a portion of the at least one associated database 106 may correspond to at least one repository 107 that stores the software code. In such an example, the at least one repository 107 of software code may include different snapshots or versions of the software code, at least some of which can correspond to different branches of the software code used for different development environments (e.g., one or more testing environments, one or more staging environments, and/or one or more production environments). The job log repositories 108 provide information characterizing, for example, one or more errors in at least one pipeline job of a software deployment pipeline.

Also, at least a portion of the one or more user devices 102 can also have at least one associated database (not explicitly shown in FIG. 1). As an example, such a database can maintain a particular branch of software code that is developed in a sandbox environment associated with a given one of the user devices 102, as discussed further below in conjunction with FIG. 3. Any changes associated with that particular branch can then be sent and merged with branches of the software code maintained in the at least one database 106, for example.

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105 in the FIG. 1 embodiment is assumed to be implemented using at least one processing device. Each such processing device generally comprises at least one processor and an associated memory, and implements one or more functional modules for controlling certain features of the software development system 105.

More particularly, the software development system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software development system 105 to communicate over the network 104 with the user devices 102, and illustratively comprises one or more conventional transceivers.

It is to be understood that the particular set of elements shown in FIG. 1 for software development system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105 and database (s) 106 can be on and/or part of the same processing platform.

Figure 2:
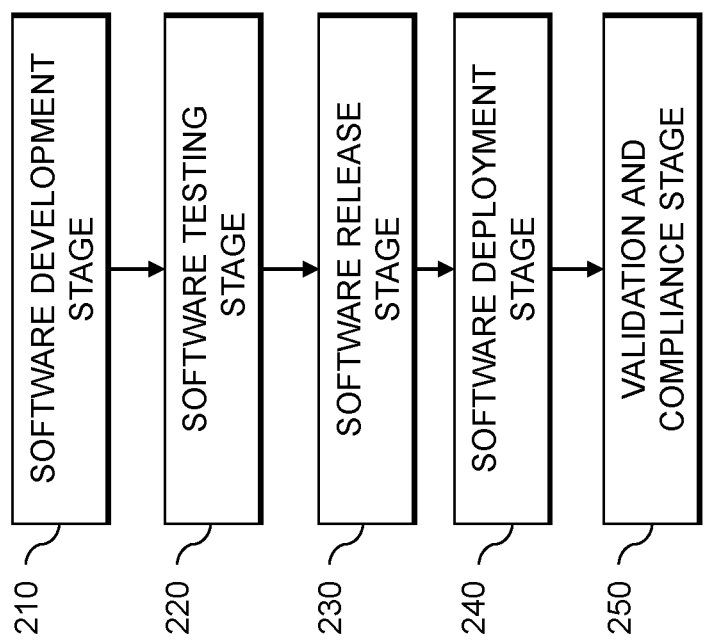
FIG. 2 shows an example of a software development lifecycle in an illustrative embodiment.

FIG. 2 shows an example of a software development lifecycle in an illustrative embodiment. A software development lifecycle is comprised of a number of stages 210 through 250. In the example of FIG. 2, a software development stage 210 comprises generating (e.g., writing) the software code for a given application. A software testing stage 220 tests the application software code. A software release stage 230 comprises delivering the application software code to a repository. A software deployment stage 240 comprises deploying the application software code to a production environment. Finally, a validation and compliance stage 250 comprises the steps to validate a deployment, for example, based at least in part on the needs of a given organization. For example, image security scanning tools may be employed to ensure a quality of the deployed images by comparing them to known vulnerabilities, such as those known vulnerabilities in a catalog of common vulnerabilities and exposures (CVEs).

In one or more embodiments, a pipeline can comprise one or more of the following elements: (i) local development environments (e.g., the computers of individual developers); (ii) a CI server (or a development server); (iii) one or more test servers (e.g., for functional user interface testing of the product); and (iv) a production environment. The pipelines may be defined, for example, in YAML (Yet Another Markup Language) with a set of commands executed in series to perform the necessary activities (e.g., the steps of each pipeline job).

Figure 3:
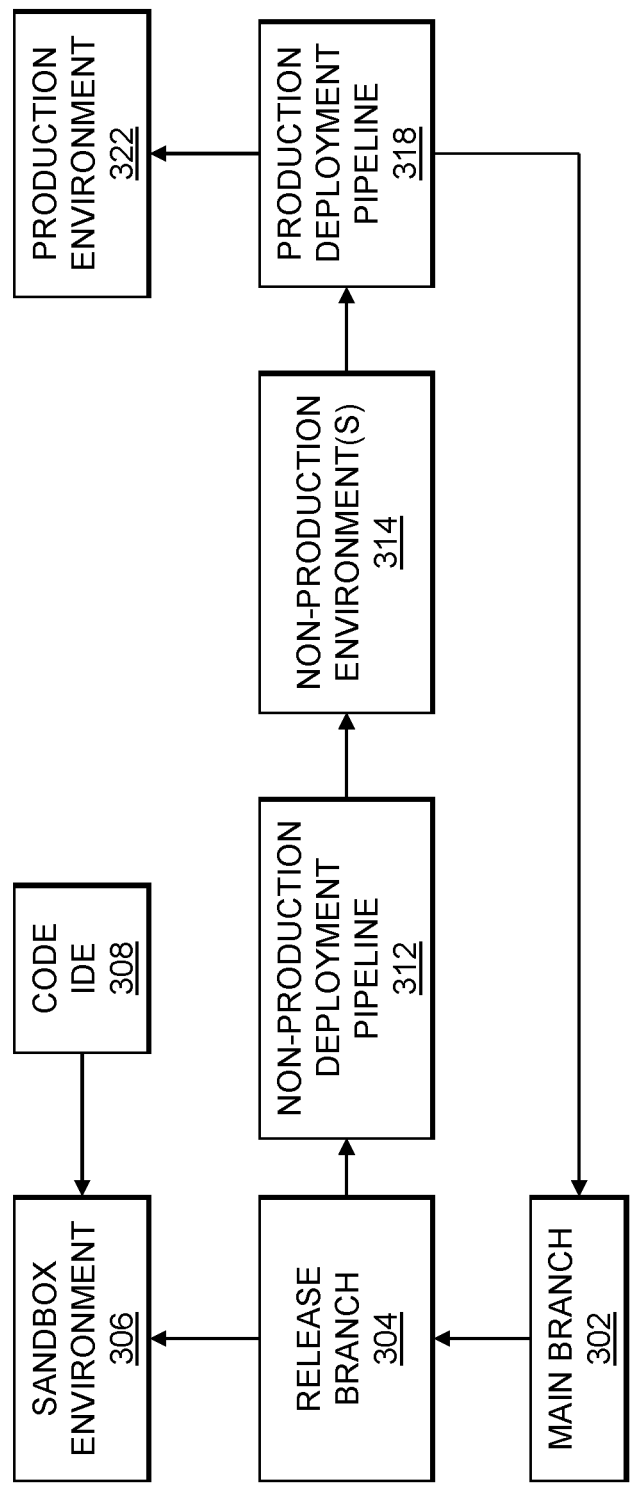
FIG. 3 shows an example of at least portions of the software development lifecycle of FIG. 2 in further detail, in accordance with an illustrative embodiment.

FIG. 3 shows an example of at least portions of the software development lifecycle of FIG. 2 in further detail in an illustrative embodiment. In the FIG. 3 example, a main branch 302 corresponds to software code of at least one software application. A release branch 304 is created based on the main branch 302. For example, the release branch 304 may be created based on development release timelines corresponding to the software application.

One or more developers (e.g., corresponding to user devices 102) create respective personal branches based on the release branch 304, and perform development work using a sandbox environment 306 and a code IDE (integration development environment) 308. Many developers prefer to write software code using such an IDE that allows the software to be developed in any programming language without having to deal with a particular language syntax. Developers may have multiple IDEs available for application development but there is currently no IDE available for writing software deployment pipeline code.

Developers can commit the changes made in their personal branches to the release branch 304. In the FIG. 3 example, a non-production deployment pipeline 312 is triggered according to one or more specified schedules. The non-production deployment pipeline 312 deploys any changes resulting from the change requests to one or more non-production environments 314.

In some examples, the non-production environment(s) 314 may include one or more of: a developer integration testing (DIT) environment, a system integration testing (SIT) environment, and a global environment. As noted above, the non-production deployment pipeline 312 may be triggered according to schedules defined for each of the non-production environments 314 (e.g., a first schedule for a DIT environment and a second schedule for an SIT environment).

A production deployment pipeline 318 can be triggered when the release branch 304 of the application is ready to be deployed to a production environment 322. Generally, the production deployment pipeline 318 collects any changes that were made to the release branch 304, creates a deployment package, and deploys the package to the production environment 322.

Figure 4:
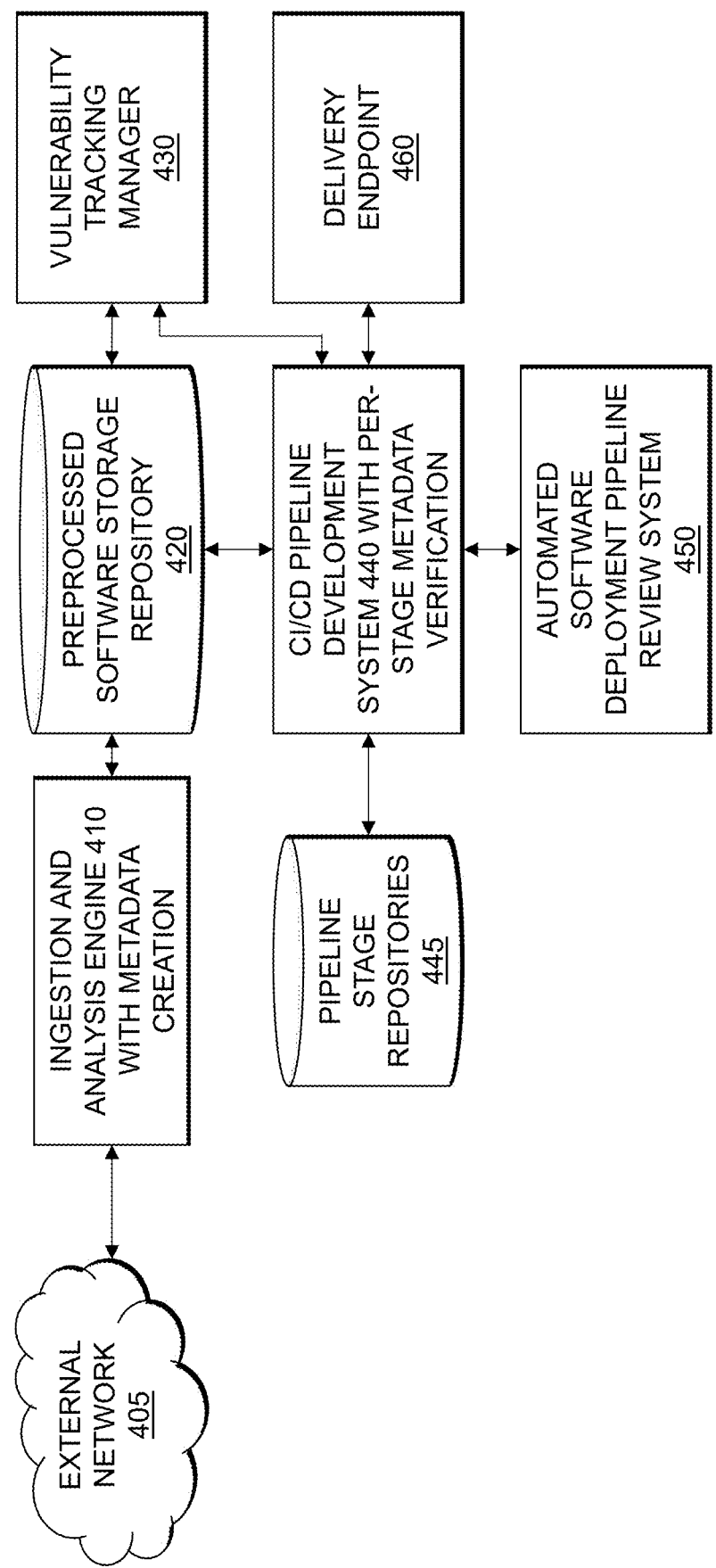
FIG. 4 illustrates an information processing environment configured for management of a software deployment pipeline, in accordance with an illustrative embodiment.

FIG. 4 illustrates an information processing environment configured for management of a software deployment pipeline, in accordance with an illustrative embodiment. In the example of FIG. 4, external content, such as external software downloaded from an external network 405, is scanned upon ingestion into a local network (sometimes referred to as a demilitarized zone (DMZ) for storage in a prescreened area. In some embodiments, the downloaded external software from the external network 405 is processed by an ingestion and analysis engine 410 (e.g., an implementation of the ingestion and analysis engine 116 of FIG. 1), prior to being made available to internal users. If a given downloaded external software item fails an inspection, a user interface may be provided to allow a user to manually investigate and remediate the inspection of the given downloaded external software item.

In addition, the ingestion and analysis engine 410 may associate metadata with each scanned software item in some embodiments. In this manner, whenever an ingested software item is retrieved, for example, for inclusion in a software deployment pipeline, the corresponding metadata may also be retrieved. The metadata may comprise, for example, a vulnerability status and vulnerability evaluation date (e.g., for malware prevention and/or mitigation), a license status and/or other license information, a date and time of the ingestion, an identifier of the scanning entity, a point of origin and identifiers of any dependent software components.

All requests for external content, such as external software, may be automatically processed by the ingestion and analysis engine 410 to provide a centralized ingestion mechanism for an organization, for example, using interception and redirection techniques that redirect such requests for content on an external network to the ingestion and analysis engine 410.

Once the downloaded external software from the external network 405 is successfully scanned, the downloaded external software is stored in a preprocessed software storage repository 420 (sometimes referred to as a green zone or a pre-inspected internal cache), along with the corresponding metadata. In this manner, a component software item repository is provided that maintains all externally sourced ingested content in some embodiments.

In the example of FIG. 4, the software items stored in the preprocessed software storage repository 420 may be evaluated by a vulnerability tracking manager 430 that maintains a database for externally sourced components to identify the impact of new common vulnerabilities and exposures (CVE) against software items used by any product. For example, the vulnerability tracking manager 430 may evaluate all items in a given SBOM for a given product against the CVE database.

A CI/CD pipeline development system 440 is provided in the example of FIG. 4 with per-stage metadata verification. In some embodiments, the CI/CD pipeline development system 440 verifies the metadata for each software item added to each pipeline stage and generates a manifest for each pipeline stage (e.g., the identifies software dependencies and other metadata, such as scan results and license information), as discussed further below in conjunction with FIGS. 5 and 7, for example. In at least some embodiments, the CI/CD pipeline development system 440 only allows a software developer to add software items to a given software deployment pipeline from the preprocessed software storage repository 420.

In one or more embodiments, each pipeline stage has a corresponding pipeline stage repository, in a set of pipeline stage repositories 445, to store the software items (e.g., artifacts) and corresponding metadata and manifest for the respective pipeline stage.

An automated software deployment pipeline review system 450 is employed in the example of FIG. 4 to automatically review a software deployment pipeline to perform, e.g., a legal review process, as discussed further below in conjunction with FIGS. 6A and 6B.

After passing all validation requirements, the software generated in a final pipeline stage is prepared by the CI/CD pipeline development system 440 for delivery to a delivery endpoint 460. For example, in the final stage, the manifest will contain an inventory of all of the dependency content contained within the product. The final manifest can be filtered and transformed by the CI/CD pipeline development system 440 to create the SBOM for customers, as discussed further below in conjunction with FIGS. 5 and 7. The delivery endpoint 460 may comprise, for example, an internal destination, a digital organization channel and/or a customer application store.

Figure 5:
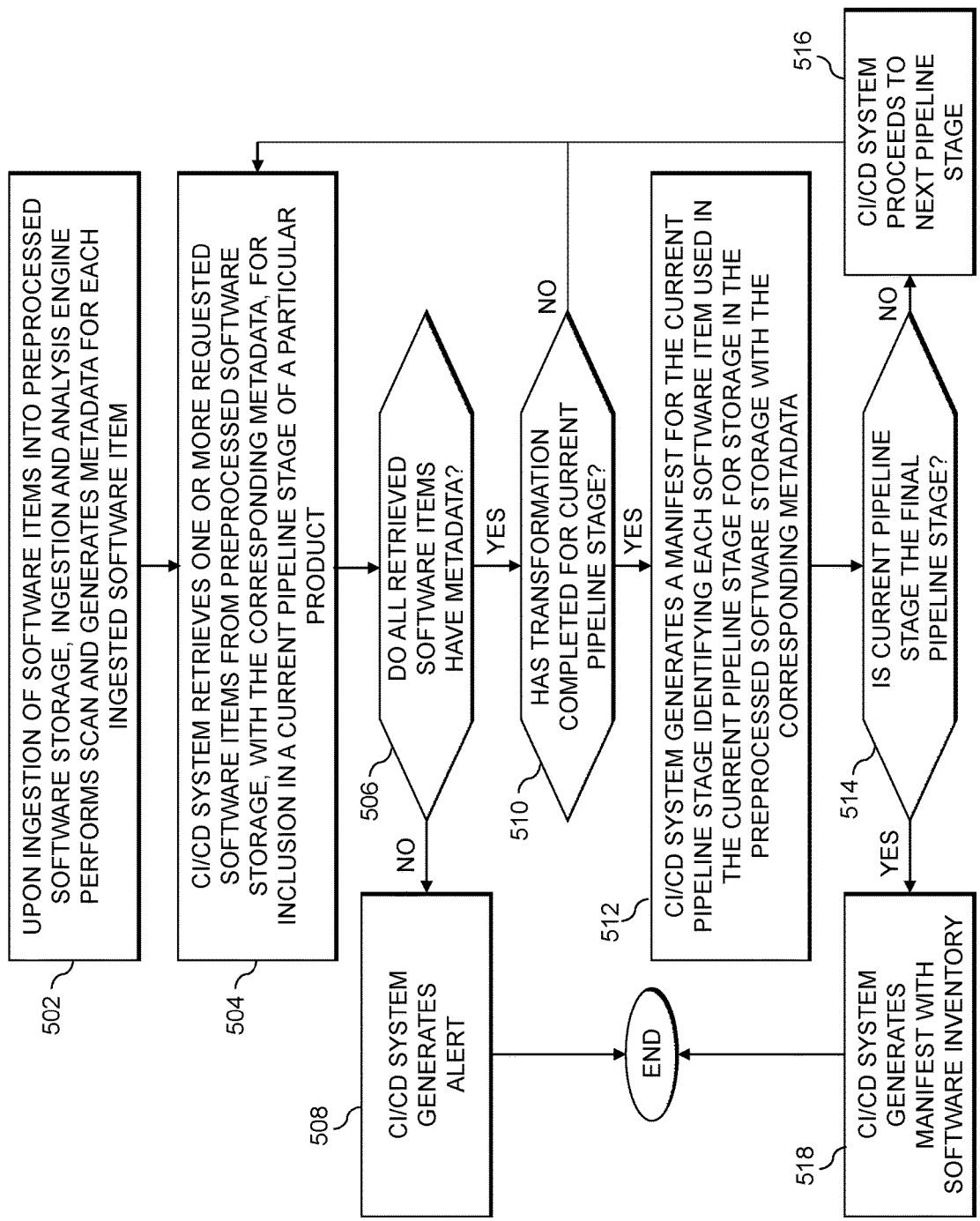
FIG. 5 is a flow chart illustrating an exemplary implementation of a process for generating a software deployment pipeline manifest using software item metadata, in accordance with an illustrative embodiment.

FIG. 5 is a flow chart illustrating an exemplary implementation of a process for generating a software deployment pipeline manifest using software item metadata, in accordance with an illustrative embodiment. In the example of FIG. 5, upon an ingestion of software items into the preprocessed software storage, the ingestion and analysis engine (e.g., ingestion and analysis engine 410) performs a scan and generates the metadata for each ingested software item in step 502. As used herein, the term software item shall be broadly construed to encompass any software bundle, software package, binary artifact and other software, as would be apparent to a person of ordinary skill in the art.

In step 504, a CI/CD system (e.g., the CI/CD pipeline development system 440) retrieves one or more requested software items from a preprocessed software storage (e.g., the preprocessed software storage repository 420), with the corresponding metadata, for inclusion in a current pipeline stage of a particular product. If a given requested software item is not found in the preprocessed software storage, the request may be redirected to step 502 in the manner described above.

A test is performed in step 506 (e.g., by a software item ingestion metadata checker and/or an unapproved OSS checker, as discussed further below in conjunction with FIG. 8) to determine if all retrieved software items have metadata. If it is determined in step 506 that one or more retrieved software items do not have metadata, then the CI/CD system generates one or more alerts in step 508 before program control ends.

If, however, it is determined in step 506 that all retrieved software items have metadata, then a further test is performed in step 510 to determine if a transformation has completed for the current pipeline stage. As used herein, a software transformation shall be broadly construed to encompass a build event (e.g., to build the source code into binaries), a package event (e.g., to assemble multiple binary objects and configurations), a deployment, a testing, a signing, and/or a generation of final reports (e.g., a SBOM), as would be apparent to a person of ordinary skill in the art.

If it is determined in step 510 that the transformation has not yet completed for the current pipeline stage, then program control returns to step 504 and continues in the manner described above. If, however, it is determined in step 510 that the transformation has completed for the current pipeline stage, then the CI/CD system generates a manifest for the current pipeline stage identifying each software item used in the current pipeline stage for storage in the preprocessed software storage (e.g., the preprocessed software storage repository 420) along with the corresponding metadata in step 512.

A test is performed in step 514 to determine if the current pipeline stage is the final pipeline stage. If it is determined in step 514 that the current pipeline stage is not the final pipeline stage, then the CI/CD system proceeds to the next pipeline stage in step 516 (e.g., obtaining the prior stage from the preprocessed software storage repository 420) before program control returns to step 504 and continues in the manner described above.

If it is determined in step 514 that the current pipeline stage is the final pipeline stage, then the CI/CD system generates a manifest in step 518 with the software inventory for the product (e.g., by filtering and reformatting the manifest from final stage) before program control ends. The generated manifest may be stored in the pipeline stage repository 445 associated with the final stage.

Figure 6A:
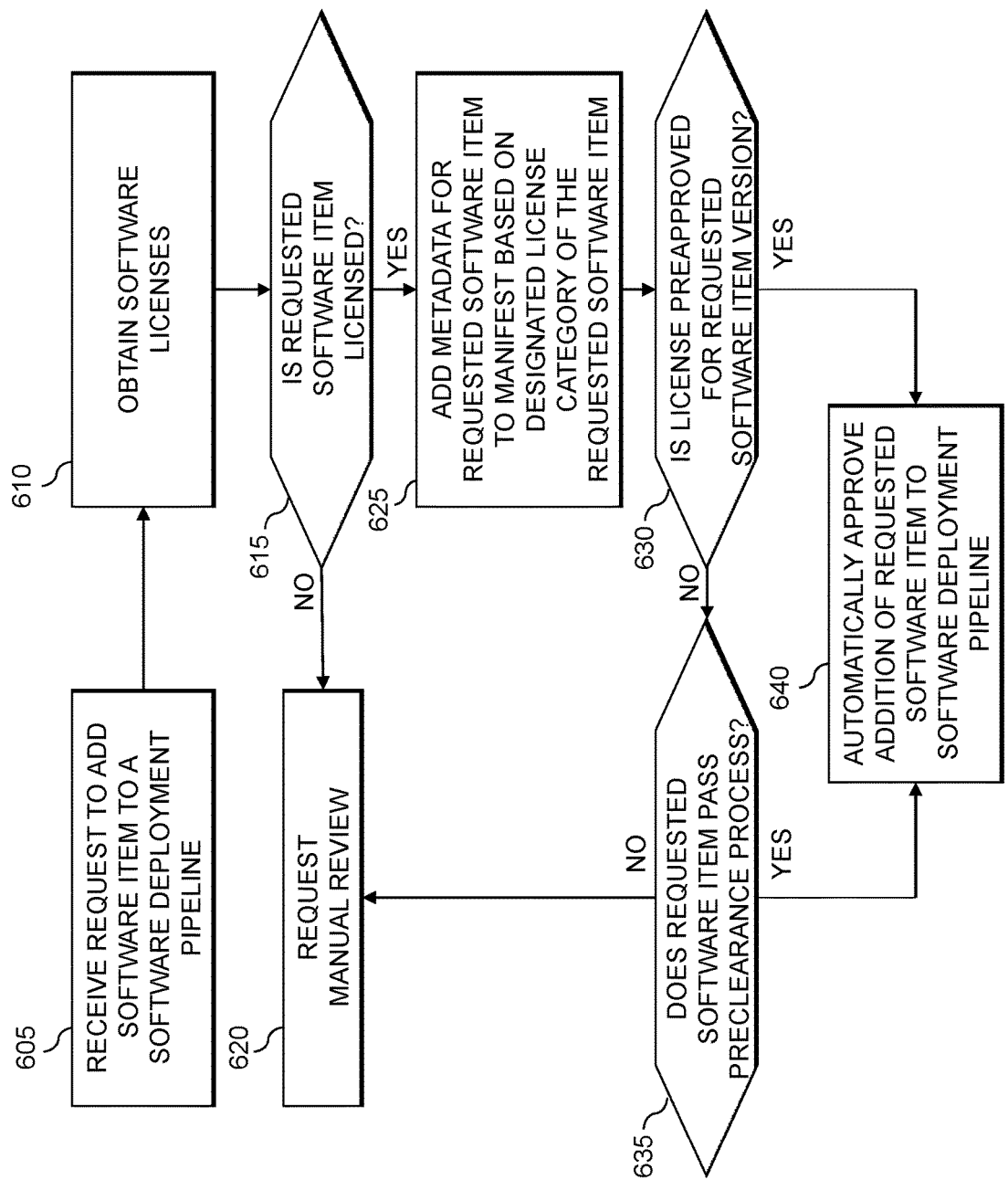
FIGS. 6A and 6B are flow charts illustrating exemplary implementations of processes for evaluating software items of a software deployment pipeline, in accordance with an illustrative embodiment.
Figure 6B:
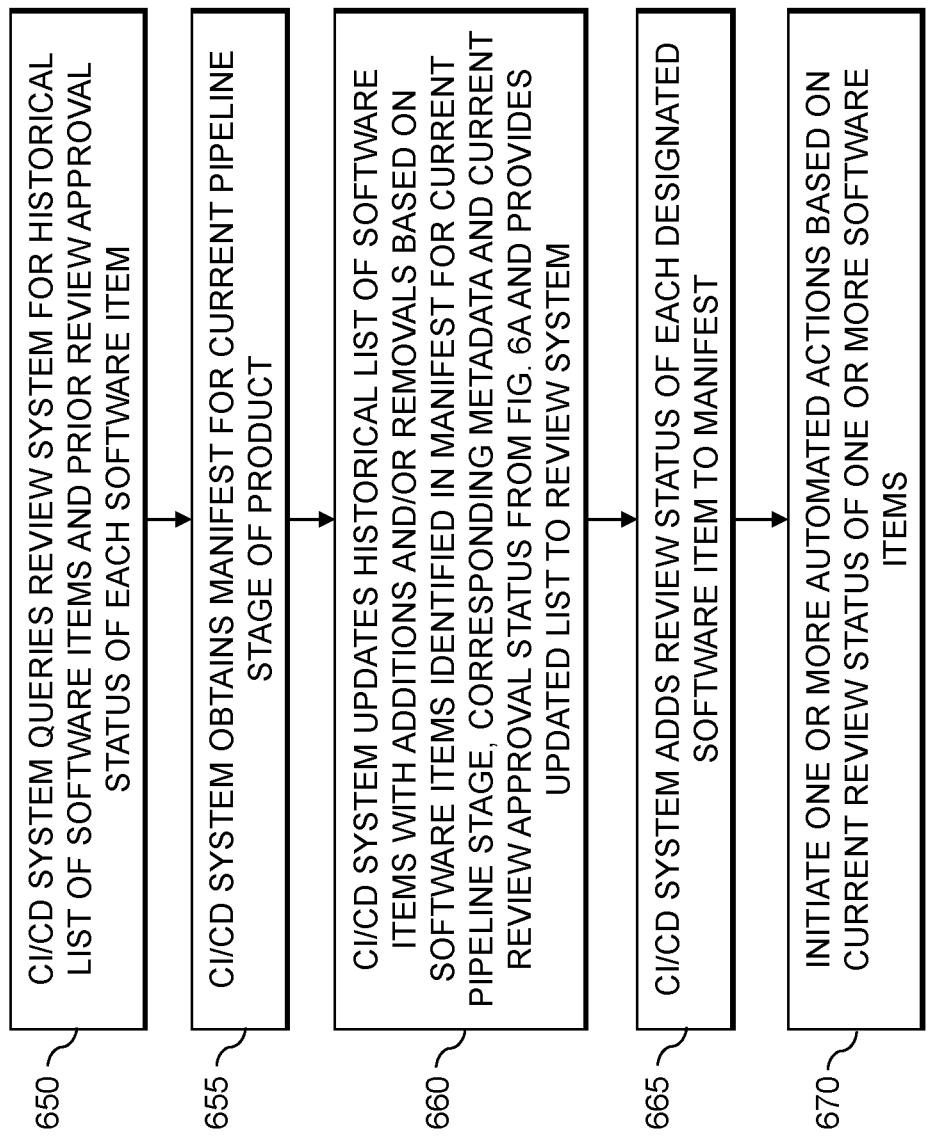

FIGS. 6A and 6B are flow charts illustrating exemplary implementations of processes for evaluating software items of a software deployment pipeline, in accordance with an illustrative embodiment. In the example of FIG. 6A, a request to add a software item (such as an open-source software item) to a software deployment pipeline is received in step 605 (e.g., e.g., by the automated review engine 120 of FIG. 1). The software item licenses are obtained in step 610 and a test is performed in step 615 to determine if the requested software item is licensed (e.g., if the requested software item appears in the software item licenses obtained in step 610). If it is determined in step 615 that the requested software item is not licensed, then a manual review is requested in step 620.

If, however, it is determined in step 615 that the requested software item is licensed, then metadata for the requested software item is added to a manifest in step 625 based on a designated license category of the requested software item. For example, the designated license categories may comprise one or more license notice categories related to software items having licenses with notice requirements and one or more restricted license categories related to software items having license restrictions. The notice categories related to software items having licenses with notice requirements may have sub-categories, for example, directed to modification and/or linking requirements or other conditions. Each designated license category may have corresponding designated metadata that can be added to the manifest of software items categorized in the respective designated license category. The metadata may comprise, for example, license information obtained when the particular software item was ingested, CVE device behavior, and designated tables specifying how different software licenses can be used.

A further test is performed in step 630 to determine if a license is preapproved for the requested software item version (e.g., an auto-approval based on a prior approval for the same product). If it is determined in step 630 that the license is not preapproved for the requested software item version, then another test is performed in step 635 to determine if the requested software item passed a preclearance process. The preclearance process may involve one or more subject matter experts that employ a designated data mining process and/or designated templates comprising one or more preclearance criteria for verification by a designated person or department (e.g., a legal department).

If it is determined in step 635 that the requested software item did not pass the preclearance process, then a manual review is requested in step 620. If, however, it is determined in step 630 that the license is preapproved for the requested software item version, or it is determined in step 635 that the requested software item passed the preclearance process, then the requested software item is automatically approved for addition to the software deployment pipeline in step 640.

In the example of FIG. 6B, the CI/CD system queries a review system (e.g., the automated software deployment pipeline review system 450) for a historical list of software items and a prior review approval status of each software item in step 650. In step 655, the CI/CD system obtains a manifest for a current pipeline stage of a given product. The CI/CD system then updates the historical list of software items in step 660 (e.g., with additions and/or removals) based on the software items identified in the manifest for the current pipeline stage of the given product, the corresponding metadata and the current review approval status from FIG. 6A, and provides the updated list to the review system.

In step 665, the CI/CD system adds a review status of each designated software item (e.g., preapproved software items) to the manifest. One or more automated actions are initiated in step 670 based on the current review status of one or more of the software items. For example, the automated actions may comprise one or more of reporting a list of software items needing approval; changing a status of a pipeline stage; and generating one or more other notifications.

Figure 7:
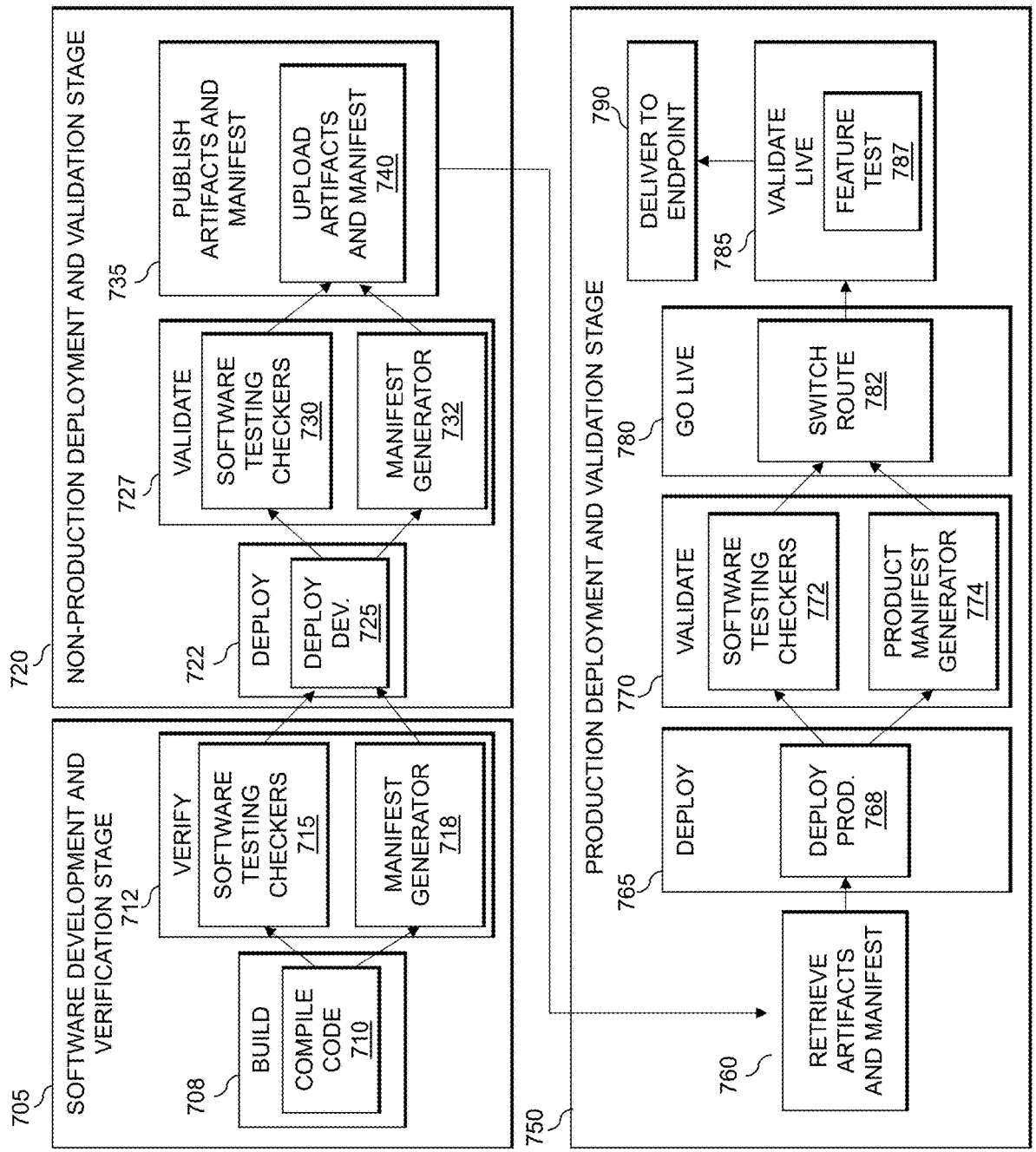
FIG. 7 illustrates a number of exemplary stages of a software deployment pipeline configured for evaluation of software deployment pipeline stages by applying software testing checkers, in accordance with an illustrative embodiment.

FIG. 7 illustrates a number of exemplary stages of a software deployment pipeline configured for evaluation of software deployment pipeline stages by applying software testing checkers, in accordance with an illustrative embodiment. In the example of FIG. 7, a software development and verification stage 705 comprises a build phase 708 and a verify phase 712. The build phase 708 comprises compiling 710 the software code associated with the build phase 708. The verify phase 712 comprises a set of software testing checkers 715 (collectively, referred to as software testing checkers 715) and a manifest generator 718. The verify phase 712 evaluates results from the software testing checkers 715 and generates a manifest of the software items in the developed software using the manifest generator 718.

A non-production deployment and validation stage 720 comprises a deploy phase 722, a validate phase 727 and a publish artifacts and manifest phase 735. The deploy phase 722 comprises deploying 725 the verified software code from the software development and verification stage 705 to the non-production environment. The validate phase 727 comprises a set of software testing checkers 730 (collectively, referred to as software testing checkers 730) and a manifest generator 732. The validate phase 727 evaluates results from the software testing checkers 730 and generates a manifest of the software items in the non-production software using the manifest generator 732.

The publish artifacts and manifest phase 735 comprises uploading 740 the validated artifacts and generated manifest to an artifact management system (e.g., that maintains deployed software code and other items related to the deployed software code).

A production deployment and validation stage 750 comprises a retrieve artifacts and manifest phase 760, a deploy phase 765, a validate phase 770, a go live phase 780, a validate live phase 785 and a deliver to endpoint phase 790.

The retrieve artifacts and manifest phase 760 retrieves the validated artifacts and manifest from the artifact management system (e.g., that maintains deployed software code). The deploy phase 765 comprises deploying 768 the validated software code from the non-production deployment and validation stage 720 to the production environment. The deployment during the deploy phase 765 is repeated in some embodiments for each production datacenter. The deployed instances of an application may have a temporary name and may not immediately overwrite the production instance. The software deployment pipeline validates these temporary applications covering the production deployment in the validate phase 770. The validate phase 770 comprises a set of software testing checkers 772 (collectively, referred to as software testing checkers 772) and a product manifest generator 774. The validate phase 770 evaluates results from the software testing checkers 772 and generates a manifest of the software items in the production software using the product manifest generator 774.

After validating the temporary application instances successfully across the production datacenters in validate phase 770, the software deployment pipeline will then perform a go live phase 780 that removes the instances currently in production and renames the temporary instances to the default name by switching the route 782. The go live phase 780 is repeated in some embodiments for each production datacenter.

The validate live phase 785 performs a feature test 787 to validate the live version of the application. Finally, the deliver to endpoint phase 790 delivers the production software to an endpoint, such as an internal destination, a digital organization channel and/or a customer application store, completing the software deployment pipeline.

In one or more embodiments, the software testing checkers 715, 730, 772 for one or more the stages 705, 720, 750, respectively, may comprise one or more of the following software testing checkers: an unapproved software item checker; a software vulnerability checker; a software license checker; a software item ingestion metadata checker; a software item review process checker, a manifest tampering checker and a security flaw checker, as discussed further below in conjunction with FIG. 8.

Figure 8:
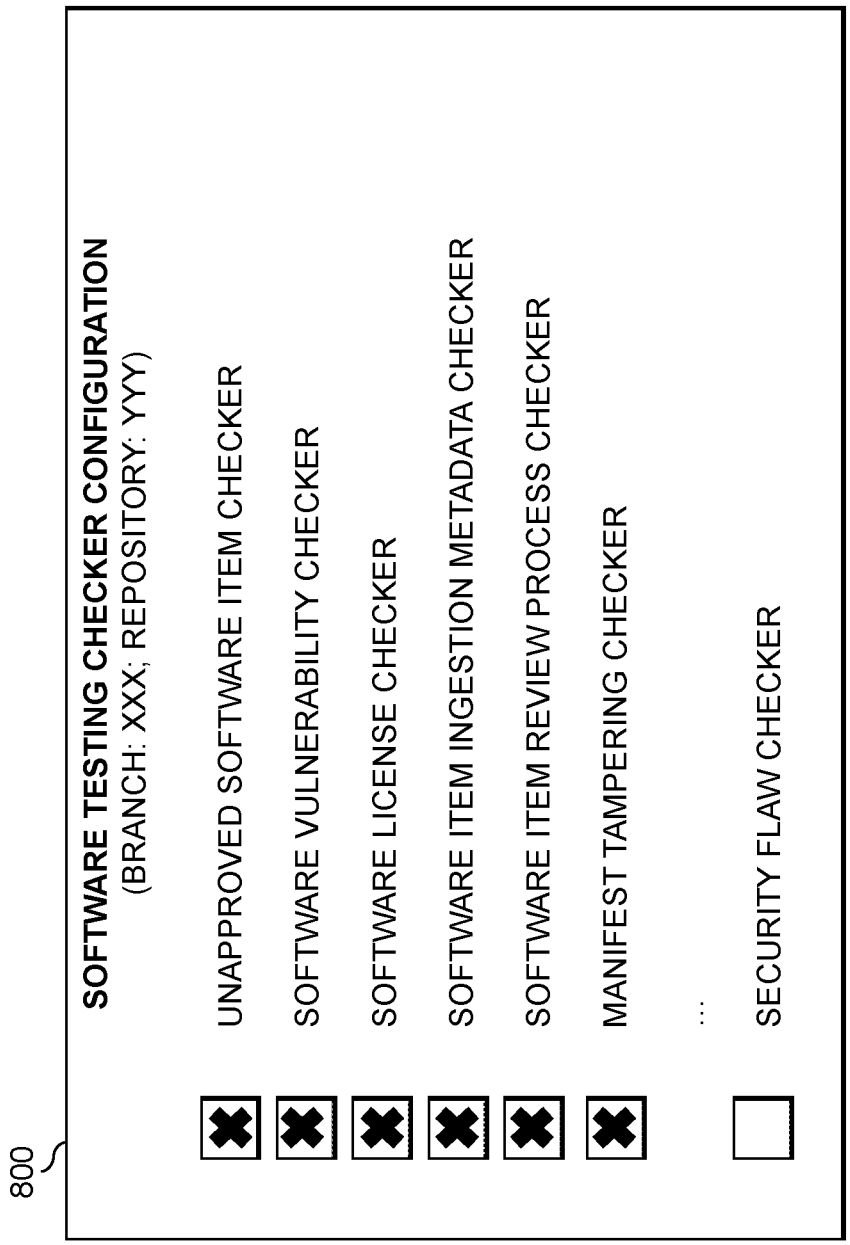
FIG. 8 illustrates a configuration of software testing checkers by selecting software testing checkers from a list of available software testing checkers in an illustrative embodiment.

FIG. 8 illustrates a configuration of software testing checkers by selecting software testing checkers from a list of available software testing checkers 800, for example, using a graphical user interface in an illustrative embodiment. The term "software testing checker" as used herein shall be broadly construed to encompass any software function or other event-driven entity that evaluates software, such as a static software scanner and/or a dynamic software scanner. The results from one or more software testing checkers may be evaluated in connection with a policy. Exemplary events associated with the software may comprise, for example, software push events, such as a software build request, a software pull request and/or a software deployment request, or other events that transition software from one stage to another (e.g., a software development stage to a software deployment stage).

In the example of FIG. 8, the software testing checkers are specified for a particular software branch and repository. The list of available software testing checkers 800 may comprise, for example, an unapproved software item checker; a software vulnerability checker; a software license checker; a software item ingestion metadata checker; a software item review process checker, a manifest tampering checker and a security flaw checker. In some embodiments, a given software testing checker may be included in a particular configuration by marking (e.g., checking) an icon associated with the given software testing checker, as shown in the example of FIG. 8.

In one or more embodiments, the unapproved software item checker may evaluate whether one or more software items appearing in a given software deployment pipeline have corresponding metadata (e.g., from the ingestion process). The software vulnerability checker may evaluate whether one or more known vulnerabilities (e.g., from a common vulnerabilities and exposures (CVE) system appear) in a given software deployment pipeline. The software license checker may evaluate the license status of one or more software items that appear in a given software deployment pipeline. The software item ingestion metadata checker may evaluate whether one or more software items that appear in a given software deployment pipeline have metadata (e.g., indicating that such software items were properly ingested into the preprocessed software storage repository 420 by an external software scan). The software item review process checker may evaluate a review status of one or more software items that appear in a given software deployment pipeline. A manifest tampering checker may evaluate whether the metadata of one or more software items that appear in a given software deployment pipeline has been tampered with. The security flaw checker whether one or more software items that appear in a given software deployment pipeline comprise security flaws.

Figure 9:
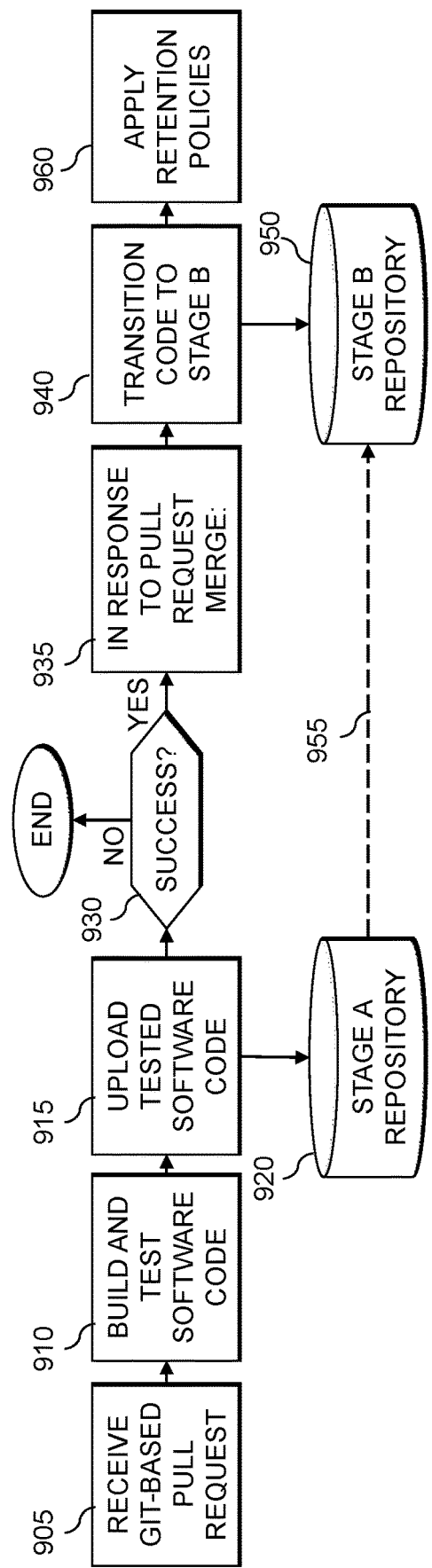
FIG. 9 is a flow chart illustrating an exemplary implementation of a process for application of storage retention policies to a software deployment pipeline in response to code branch mergers, in accordance with an illustrative embodiment.

FIG. 9 is a flow chart illustrating an exemplary implementation of a process for application of storage retention policies to a software deployment pipeline in response to code branch mergers, in accordance with an illustrative embodiment. In the example of FIG. 9, a git-based pull request is received in step 905 (for example, associated with a particular stage A). The software code is then built and tested in step 910, and then uploaded in step 915, for example, to a stage A software repository 920.

A test is performed in step 930 to determine if the software code passed one or more quality control checks and was properly uploaded to the stage A software repository 920 (e.g., a software repository associated with the current pipeline stage). If it is determined in step 930 that the software code did not pass one or more quality control checks or was not properly uploaded to the stage A software repository 920, then program control ends.

If it is determined in step 930 that the software code passed the one or more quality control checks and was properly uploaded to the stage A software repository 920, then, in step 935, in response to a merge event associated with the pull request, the software code is transitioned to the next stage (e.g., stage B) in step 940, for example, using a build promotion 955 of the code to move and/or copy software code from the stage A software repository 920 (e.g., a software repository associated with the prior pipeline stage) to a stage B software repository 950 (e.g., a software repository associated with the new pipeline stage), and one or more retention policies are applied in step 960 to the stage A software repository 920 (e.g., the software repository associated with the prior pipeline stage).

In some embodiments, sample retention policies for a given stage may designate that certain software items should be retained for 5 days (with older software items deleted). Thus, the five-day rule will be applied to applicable software items of the prior pipeline stage. Exemplary retention criteria may comprise an age of one or more software items associated with the software deployment pipeline, a last download time of the one or more software items, a repository location of the one or more software items, a designated number of builds to be retained based at least in part on a given build identifier and one or more designated search criteria for the one or more software items.

Figure 10:
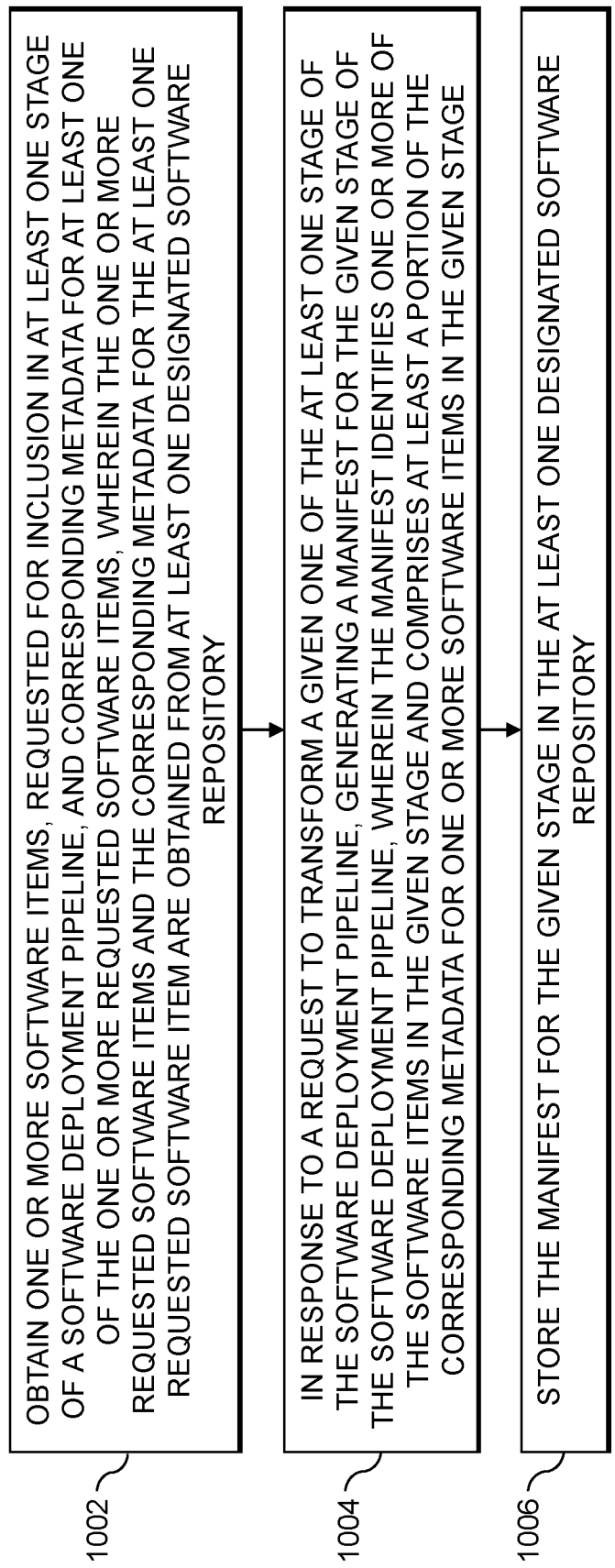
FIG. 10 is a flow chart illustrating an exemplary implementation of a process for generation of a software deployment pipeline manifest using software item metadata, in accordance with an illustrative embodiment.

FIG. 10 is a flow chart illustrating an exemplary implementation of a process for generation of a software deployment pipeline manifest using software item metadata, in accordance with an illustrative embodiment. In the example of FIG. 10, one or more software items, requested for inclusion in at least one stage of a software deployment pipeline, are obtained in step 1002 with corresponding metadata for at least one of the one or more requested software items, wherein the one or more requested software items and the corresponding metadata for the at least one requested software item are obtained from at least one designated software repository.

In step 1004, in response to a request to transform a given one of the at least one stage of the software deployment pipeline, a manifest is generated for the given stage of the software deployment pipeline, wherein the manifest identifies one or more of the software items in the given stage and comprises at least a portion of the corresponding metadata for one or more of the software items in the given stage. The manifest for the given stage is stored in step 1006 in the at least one designated software repository (such as a green zone (e.g., the preprocessed software storage repository 420)).

In at least some embodiments, the request to transform the given stage of the software deployment pipeline is detected by monitoring (for example, based on subscriptions) one or more events published on a message queue. The metadata for a given software item may comprise a vulnerability status, a vulnerability review date, an ingestion time information, a code ingestion and analysis engine identifier, a given software item source identifier, one or more dependent software component identifiers and/or software license information associated with the given software item.

In one or more embodiments, one or more automated actions are initiated in response to the metadata for a given requested software item being unavailable. The one or more automated actions may comprise preventing a promotion of the software deployment pipeline to a next stage, generating one or more notifications, failing a validation of the given stage of the software deployment pipeline and/or initiating a designated review process.

In an embodiment, a storage of the one or more software items in the designated software repository comprises evaluating, prior to the storage, at least one of: (i) a presence of one or more designated vulnerabilities in the one or more software items and (ii) a license review status of the one or more software items. The storage of the one or more software items in the designated software repository may comprise generating the metadata for the one or more software items. The manifest for the given stage may be retrieved from the designated software repository for a subsequent stage of the software deployment pipeline. At least a portion of the manifest associated with a final stage of the software deployment pipeline may be filtered and/or reformatted.

Figure 11:
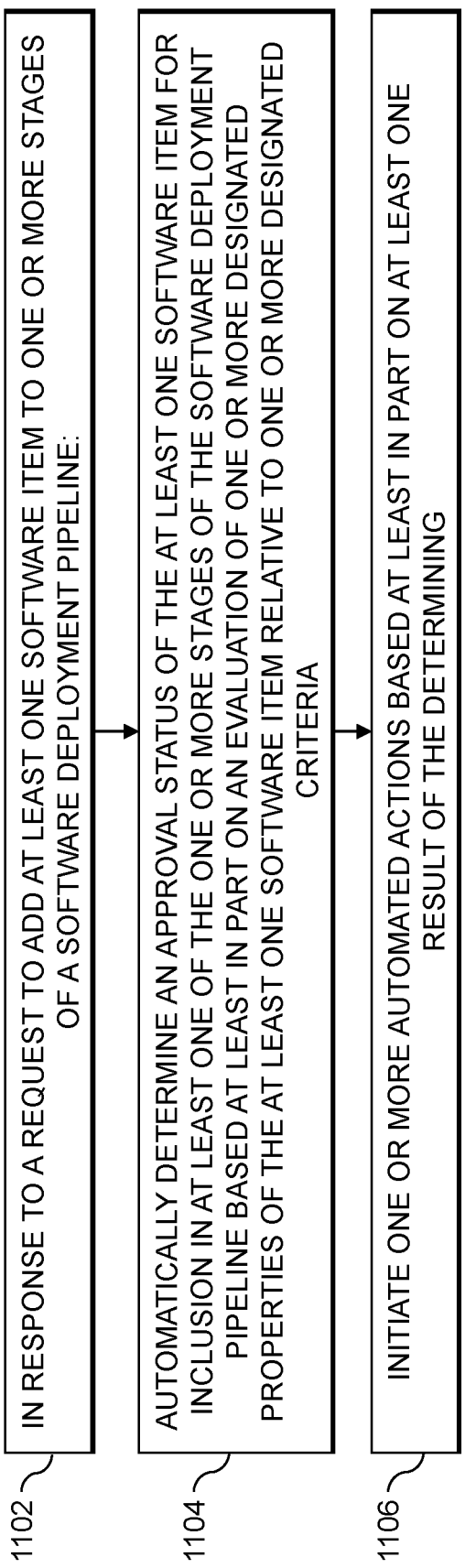
FIG. 11 is a flow chart illustrating an exemplary implementation of a process for automated evaluation of software items of a software deployment pipeline, in accordance with an illustrative embodiment.

FIG. 11 is a flow chart illustrating an exemplary implementation of a process for automated evaluation of software items of a software deployment pipeline, in accordance with an illustrative embodiment. In the example of FIG. 11, in response to a request to add at least one software item to one or more stages of a software deployment pipeline in step 1102: automatically determining an approval status in step 1104 of the at least one software item for inclusion in at least one of the one or more stages of the software deployment pipeline based at least in part on an evaluation of one or more designated properties of the at least one software item relative to one or more designated criteria (e.g., designated preclearance criteria). One or more automated actions may be initiated in step 1106 based at least in part on at least one result of the determining.

In some embodiments, the software deployment pipeline is associated with a particular product and the one or more designated properties of the at least one software item may be specified for the particular product. The one or more designated properties of the at least one software item may comprise, for example, a version of the at least one software item and/or an approval status of the at least one software item. The request to add the at least one software item to the one or more stages of the software deployment pipeline may comprise obtaining the at least one software item from a designated software repository. In response to a request to ingest the at least one software item into a designated software repository, it may be determined whether the at least one software item is licensed.

In one or more embodiments, a classification is obtained of the at least one software item into one or more of a plurality of designated license categories; and one or more license guidelines associated with the one or more designated license categories may be obtained. Metadata may be added to a manifest (e.g., a bill of materials) of software items associated with a given stage of the software deployment pipeline, wherein the metadata for the at least one software item is based at least in part on the one or more designated license categories. Real-time changes may be applied to the one or more designated properties of the at least one software item.

In at least some embodiments, the one or more automated actions comprise failing a validation of one or more of the stages of the software deployment pipeline, initiating a designated review process, preventing a promotion of the software deployment pipeline to a next stage and/or generating one or more notifications.

Figure 12:
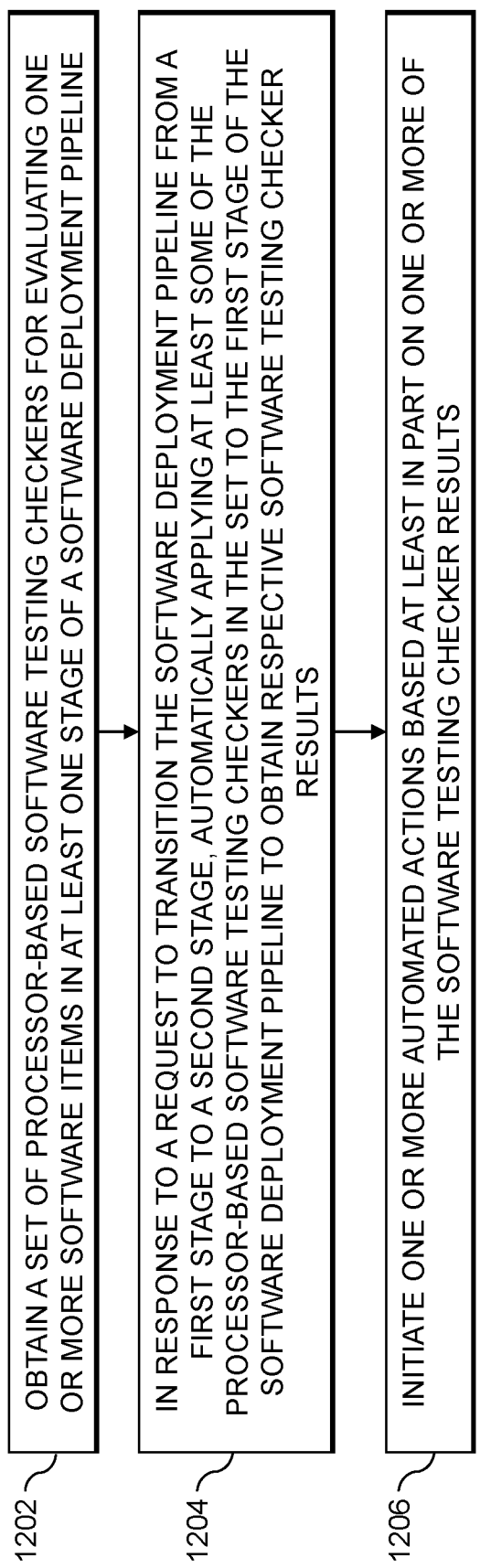
FIG. 12 is a flow chart illustrating an exemplary implementation of a process for evaluation of software deployment pipeline stages by applying software testing checkers, in accordance with an illustrative embodiment.

FIG. 12 is a flow chart illustrating an exemplary implementation of a process for evaluation of software deployment pipeline stages by applying software testing checkers, in accordance with an illustrative embodiment. In the example of FIG. 12, a set of processor-based software testing checkers are obtained in step 1202 for evaluating one or more software items in at least one stage of a software deployment pipeline. In response to a request to transition the software deployment pipeline from a first stage to a second stage, at least some of the processor-based software testing checkers in the set are automatically applied in step 1204 to the first stage of the software deployment pipeline to obtain respective software testing checker results. In step 1206, one or more automated actions are initiated based at least in part on one or more of the software testing checker results.

In some embodiments, the request to transition the software deployment pipeline from the first stage to the second stage is detected by monitoring (e.g., by subscribing to) one or more events published on a message queue. The one or more automated actions may comprise failing a validation of one or more of the stages of the software deployment pipeline, initiating a designated review process, preventing a promotion of the software deployment pipeline to a next stage, promoting the software deployment pipeline to a next stage and/or generating one or more notifications.

In one or more embodiments, the set of processor-based software testing checkers for evaluating the one or more software items in the at least one stage of the software deployment pipeline is populated by selecting from at least one listing of designated software testing checkers. A delivery of a product associated with the software deployment pipeline may be permitted, for example, based at least in part on one or more of the software testing checker results from the processor-based software testing checkers associated with a final stage of the software deployment pipeline.

In at least some embodiments, a transition to a next stage of the software deployment pipeline is permitted (or denied) based at least in part on one or more of the software testing checker results from the processor-based software testing checkers associated with a prior stage of the software deployment pipeline. A software testing checker result from a given processor-based software testing checker may be processed using one or more rules specified for the given processor-based software testing checker.

Figure 13:
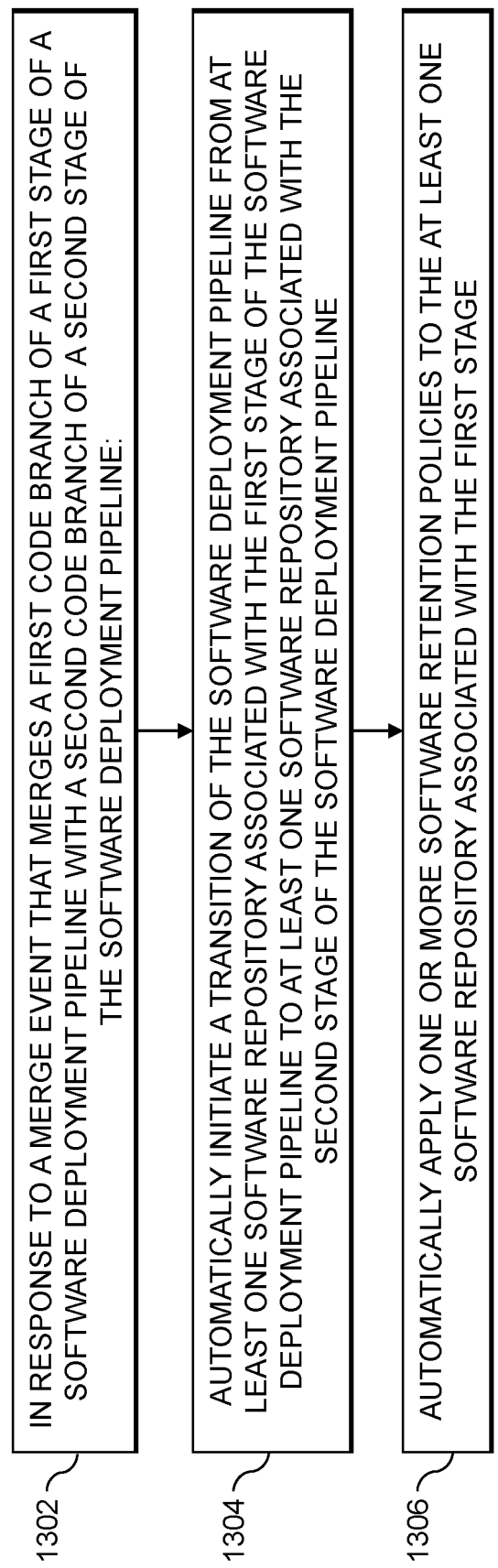
FIG. 13 is a flow chart illustrating an exemplary implementation of a process for application of storage retention policies to a software deployment pipeline in response to code branch mergers, in accordance with an illustrative embodiment.

FIG. 13 is a flow chart illustrating an exemplary implementation of a process for application of storage retention policies to a software deployment pipeline in response to code branch mergers, in accordance with an illustrative embodiment. In the example of FIG. 13, in response to a merge event in step 1302 that merges a first code branch of a first stage of a software deployment pipeline with a second code branch of a second stage of the software deployment pipeline: a transition of the software deployment pipeline is automatically initiated in step 1304 from at least one software repository associated with the first stage of the software deployment pipeline to at least one software repository associated with the second stage of the software deployment pipeline; and one or more software retention policies are automatically applied in step 1306 to the at least one software repository associated with the first stage.

In some embodiments, the merge event is detected by monitoring (e.g., by subscribing to) one or more events published on a message queue. The merge of the first code branch of the first stage of the software deployment pipeline with the second code branch of the second stage of the software deployment pipeline may be performed in connection with a processing of a pull request. The transition of the software deployment pipeline from the at least one software repository associated with the first stage to the at least one software repository associated with the second stage may be performed in connection with a processing of a build promotion.

In one or more embodiments, the transition of the software deployment pipeline from the at least one software repository associated with the first stage to the at least one software repository associated with the second stage moves and/or copies one or more software items from the at least one software repository associated with the first stage to the at least one software repository associated with the second stage. The automatically applying the one or more software retention policies may comprise executing one or more retention scripts for the at least one software repository associated with the first stage.

The particular processing operations and other network functionality described in conjunction with the flow diagrams of FIGS. 2, 3, 5, 6A, 6B and 9 through 13, for example, are presented by way of illustrative example only, and should not be construed as limiting the scope of the disclosure in any way. Alternative embodiments can use other types of processing operations to provide functionality for management of a software deployment pipeline. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, the disclosed software deployment pipeline management techniques systematically generate a software deployment pipeline manifest for each pipeline stage using metadata for the software items in the respective pipeline stage. In some embodiments, the disclosed software deployment pipeline management techniques systematically evaluate the software items added to a software deployment pipeline. The evaluation of one or more of the software deployment pipeline stages may apply software testing checkers in at least some embodiments. Storage retention policies may be automatically applied to a software deployment pipeline in response to code branch mergers.

It should also be understood that the disclosed techniques for management of a software deployment pipeline can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automated resolution of one or more pipeline errors may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based generation of a software deployment pipeline manifest generation engine, or portions thereof, are illustratively implemented for use by tenants of such a multi-tenant environment.

Cloud infrastructure as disclosed herein can include cloud-based systems. Virtual machines provided in such systems can be used to implement at least portions of a generation of a software deployment pipeline manifest generation platform in illustrative embodiments. The cloud-based systems can include object stores.

In some embodiments, the cloud infrastructure additionally or alternatively comprises a plurality of containers implemented using container host devices. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 14 and 15. These platforms may also be used to implement at least portions of other information processing systems in other embodiments.

Figure 14:
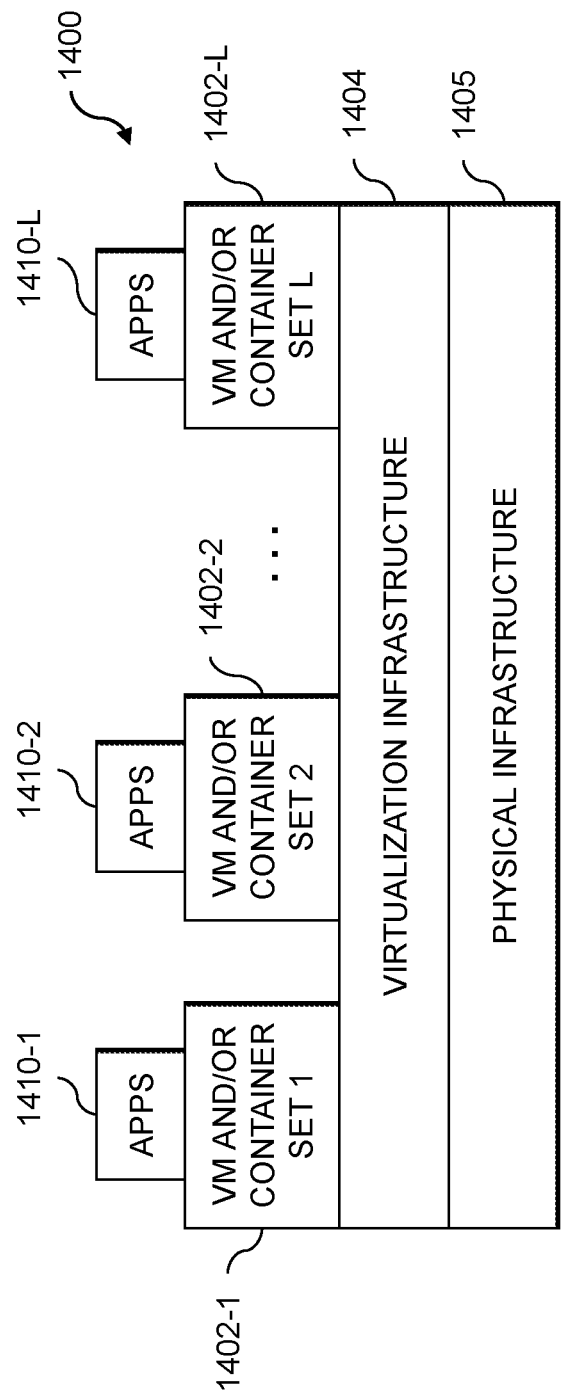
FIG. 14 illustrates an exemplary processing platform that may be used to implement at least a portion of one or more embodiments of the disclosure comprising a cloud infrastructure.

FIG. 14 shows an example processing platform comprising cloud infrastructure 1400. The cloud infrastructure 1400 comprises a combination of physical and virtual processing resources that may be utilized to implement at least a portion of the information processing system 100. The cloud infrastructure 1400 comprises multiple VMs and/or container sets 1402-1, 1402-2 . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2 . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. Such implementations can provide generation of a software deployment pipeline manifest generation functionality of the type described above for one or more processes running on a given one of the VMs. For example, each of the VMs can implement generation of a software deployment pipeline manifest generation control logic and associated software deployment pipeline recommendation functionality for one or more processes running on that particular VM.

An exemplary hypervisor platform used to implement a hypervisor within the virtualization infrastructure 1404 may have an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system. Such implementations can provide generation of a software deployment pipeline manifest generation functionality of the type described above for one or more processes running on different ones of the containers. For example, a container host device supporting multiple containers of one or more container sets can implement one or more instances of generation of a software deployment pipeline manifest generation control logic and associated software deployment pipeline recommendation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises at least a portion of the given system and includes a plurality of processing devices, denoted 1502-1, 1502-2, 1502-3, . . . 1502-K, which communicate with one another over a network 1504. The network 1504 may comprise any type of network, such as a WAN, a LAN, a satellite network, a telephone or cable network, a cellular network, a wireless network such as WiFi or WiMAX, or various portions or combinations of these and other types of networks.

The processing device 1502-1 in the processing platform 1500 comprises a processor 1510 coupled to a memory 1512. The processor 1510 may comprise a microprocessor, a microcontroller, an ASIC, an FPGA or other type of processing circuitry, as well as portions or combinations of such circuitry elements, and the memory 1512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the given system may include additional or alternative processing platforms, as well as numerous distinct processing platforms in any combination, with each such platform comprising one or more computers, storage devices or other processing devices.

Figure 15:
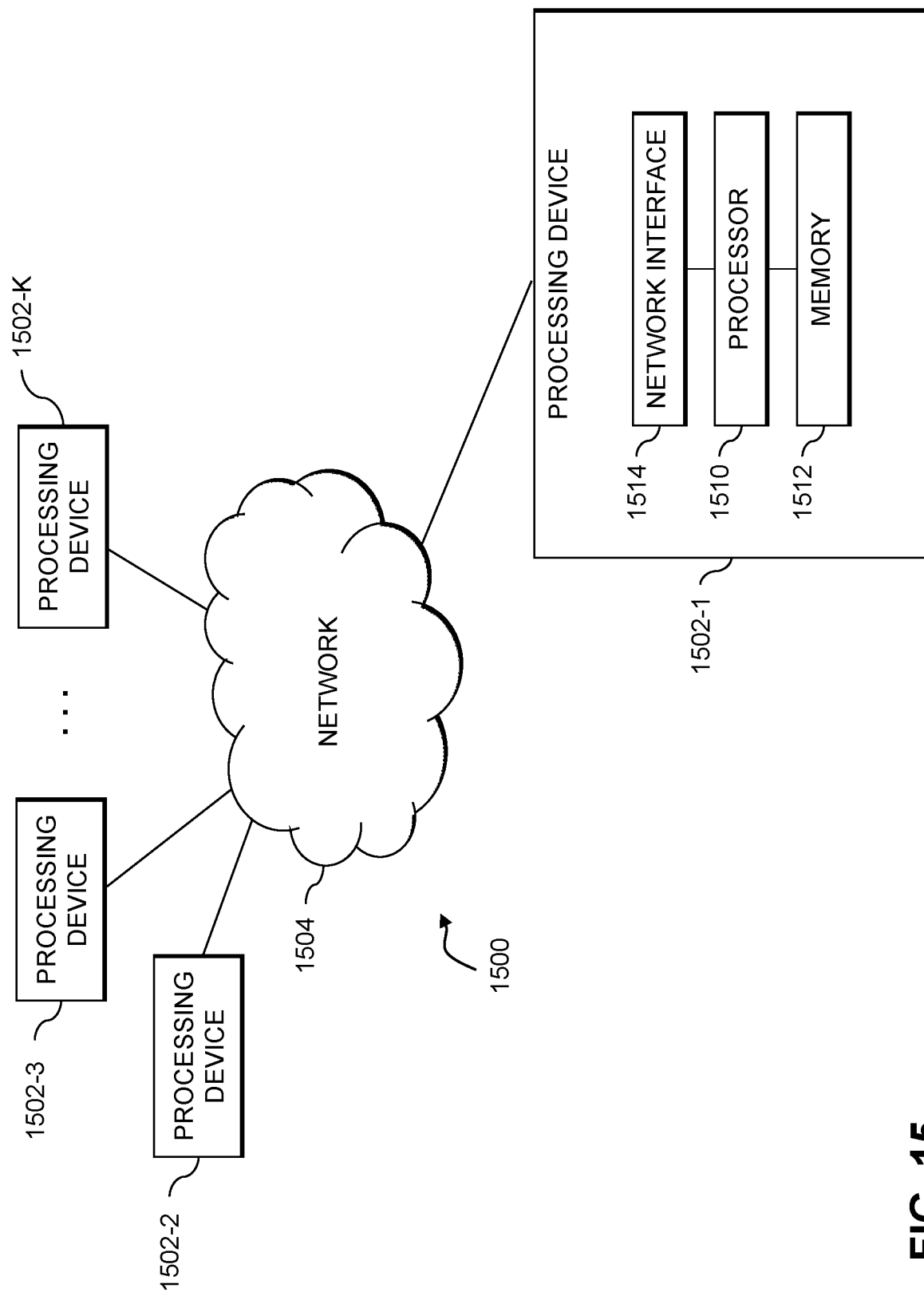
FIG. 15 illustrates another exemplary processing platform that may be used to implement at least a portion of one or more embodiments of the disclosure.

Multiple elements of an information processing system may be collectively implemented on a common processing platform of the type shown in FIG. 14 or 15, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   in response to a merge event that merges a first code branch of a first stage of a software deployment pipeline with a second code branch of a second stage of the software deployment pipeline:
   automatically initiating a transition of the software deployment pipeline from at least one software repository associated with the first stage of the software deployment pipeline to at least one software repository associated with the second stage of the software deployment pipeline; and
   automatically applying, responsive to the merge event, one or more software retention policies to the at least one software repository associated with the first stage, wherein the one or more software retention policies are specified for the at least one software repository associated with the first stage;
   wherein the method is performed by at least one processing device comprising a processor coupled to a memory.

2. The method of claim 1, wherein the merge event is detected by monitoring one or more events published on a message queue.

3. The method of claim 1, wherein the merge of the first code branch of the first stage of the software deployment pipeline with the second code branch of the second stage of the software deployment pipeline is performed in connection with a processing of a pull request.

4. The method of claim 1, wherein the transition of the software deployment pipeline from the at least one software repository associated with the first stage to the at least one software repository associated with the second stage is performed in connection with a processing of a build promotion.

5. The method of claim 1, wherein the transition of the software deployment pipeline from the at least one software repository associated with the first stage to the at least one software repository associated with the second stage one or more of moves and copies one or more software items from the at least one software repository associated with the first stage to the at least one software repository associated with the second stage.

6. The method of claim 1, wherein the at least one software repository associated with the first stage and the at least one software repository associated with the second stage are part of a storage system.

7. The method of claim 1, wherein the one or more software retention policies are based at least in part on one or more of: an age of one or more software items associated with the software deployment pipeline, a last download time of the one or more software items, a repository location of the one or more software items, a designated number of retained builds based at least in part on a given build identifier and one or more designated search criteria for the one or more software items.

8. The method of claim 1, wherein the automatically applying the one or more software retention policies comprises executing one or more retention scripts for the at least one software repository associated with the first stage.

9. An apparatus comprising:
   at least one processing device comprising a processor coupled to a memory;
   the at least one processing device being configured to implement the following steps:
   in response to a merge event that merges a first code branch of a first stage of a software deployment pipeline with a second code branch of a second stage of the software deployment pipeline:
   automatically initiating a transition of the software deployment pipeline from at least one software repository associated with the first stage of the software deployment pipeline to at least one software repository associated with the second stage of the software deployment pipeline; and
   automatically applying, responsive to the merge event, one or more software retention policies to the at least one software repository associated with the first stage, wherein the one or more software retention policies are specified for the at least one software repository associated with the first stage.

10. The apparatus of claim 9, wherein the merge event is detected by monitoring one or more events published on a message queue.

11. The apparatus of claim 9, wherein the merge of the first code branch of the first stage of the software deployment pipeline with the second code branch of the second stage of the software deployment pipeline is performed in connection with a processing of a pull request.

12. The apparatus of claim 9, wherein the transition of the software deployment pipeline from the at least one software repository associated with the first stage to the at least one software repository associated with the second stage is performed in connection with a processing of a build promotion.

13. The apparatus of claim 9, wherein the transition of the software deployment pipeline from the at least one software repository associated with the first stage to the at least one software repository associated with the second stage one or more of moves and copies one or more software items from the at least one software repository associated with the first stage to the at least one software repository associated with the second stage.

14. The apparatus of claim 9, wherein the automatically applying the one or more software retention policies comprises executing one or more retention scripts for the at least one software repository associated with the first stage.

15. The apparatus of claim 9, wherein the one or more software retention policies are based at least in part on one or more of: an age of one or more software items associated with the software deployment pipeline, a last download time of the one or more software items, a repository location of the one or more software items, a designated number of retained builds based at least in part on a given build identifier and one or more designated search criteria for the one or more software items.

16. A non-transitory processor-readable storage medium having stored therein program code of one or more software programs, wherein the program code when executed by at least one processing device causes the at least one processing device to perform the following steps:
in response to a merge event that merges a first code branch of a first stage of a software deployment pipeline with a second code branch of a second stage of the software deployment pipeline:
automatically initiating a transition of the software deployment pipeline from at least one software repository associated with the first stage of the software deployment pipeline to at least one software repository associated with the second stage of the software deployment pipeline; and
automatically applying, responsive to the merge event, one or more software retention policies to the at least one software repository associated with the first stage, wherein the one or more software retention policies are specified for the at least one software repository associated with the first stage.

17. The non-transitory processor-readable storage medium of claim 16, wherein the merge of the first code branch of the first stage of the software deployment pipeline with the second code branch of the second stage of the software deployment pipeline is performed in connection with a processing of a pull request.

18. The non-transitory processor-readable storage medium of claim 16, wherein the transition of the software deployment pipeline from the at least one software repository associated with the first stage to the at least one software repository associated with the second stage is performed in connection with a processing of a build promotion.

19. The non-transitory processor-readable storage medium of claim 16, wherein the transition of the software deployment pipeline from the at least one software repository associated with the first stage to the at least one software repository associated with the second stage one or more of moves and copies one or more software items from the at least one software repository associated with the first stage to the at least one software repository associated with the second stage.

20. The non-transitory processor-readable storage medium of claim 16, wherein the automatically applying the one or more software retention policies comprises executing one or more retention scripts for the at least one software repository associated with the first stage.

* * * * *